(12) United States Patent
Rüdiger et al.

(10) Patent No.: US 8,414,823 B2
(45) Date of Patent: Apr. 9, 2013

(54) METHOD FOR THE PRODUCTION OF MULTILAYER CONTAINERS

(75) Inventors: Claus Rüdiger, Krefeld (DE); Heinrich Hähnsen, Duisburg (DE); Alexander Meyer, Düsseldorf (DE); Klaus Kraner, Solingen (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 12/531,354

(22) PCT Filed: Mar. 6, 2008

(86) PCT No.: PCT/EP2008/001777
§ 371 (c)(1),
(2), (4) Date: Sep. 15, 2009

(87) PCT Pub. No.: WO2008/113479
PCT Pub. Date: Sep. 25, 2008

(65) Prior Publication Data
US 2010/0086716 A1    Apr. 8, 2010

(30) Foreign Application Priority Data
Mar. 16, 2007  (DE) .......................... 10 2007 013 273

(51) Int. Cl.
*B29C 49/22*        (2006.01)
(52) U.S. Cl.
USPC ............................ 264/514; 264/515; 264/540
(58) Field of Classification Search .................... None
See application file for complete search history.

(56) References Cited

U.S. PATENT DOCUMENTS

| 4,327,137 A * | 4/1982 | Sawa et al. ................... 428/36.6 |
| 4,877,682 A * | 10/1989 | Sauers et al. .................. 428/412 |
| 4,887,682 A | 12/1989 | Drutchas et al. |
| 6,613,869 B1 * | 9/2003 | Horn et al. ..................... 528/198 |
| 2004/0013862 A1 | 1/2004 | Brebion et al. |
| 2004/0198893 A1 | 10/2004 | Nelson et al. |

FOREIGN PATENT DOCUMENTS

| DE | 4433072 A1 | 3/1996 |
| DE | 10216175 C1 | 7/2003 |
| EP | 0195229 A2 | 9/1986 |
| EP | 0217167 A1 | 4/1987 |
| EP | 0764515 A2 | 3/1997 |
| EP | 1048436 A1 | 11/2000 |
| WO | WO-02/094560 A2 | 11/2002 |

OTHER PUBLICATIONS

Lee, Norman C. Practical Guide to Blow Molding. Shawbury: 2006. pp. 1-2, 98, 103-104.*

* cited by examiner

*Primary Examiner* — Monica A Huson
(74) *Attorney, Agent, or Firm* — Novak Druce Connolly Bove + Quigg LLP

(57) ABSTRACT

The present invention concerns a process for producing a container having at least one layer and a top layer, wherein the layer contains polycarbonate and the top layer contains polyarylethersulfone or polyarylsulfone, characterised in that a) polycarbonate is melted on an extruder at 230-320° C., b) polyarylethersulfone or polyarylsulfone is melted on a further extruder, c) the melts obtained from steps a) and b) are shaped by coextrusion into a tube, which is then enclosed in a mould, d) the extrudate is inflated inside the mould and pressed against the wall of the mould, forming the shape of the container, and e) the container obtained from d) is trimmed and cooled, such containers and the use of the containers as bottles or medical devices.

5 Claims, No Drawings

METHOD FOR THE PRODUCTION OF MULTILAYER CONTAINERS

RELATED APPLICATIONS

This application is a national stage application (under 35 U.S.C. §371) of PCT/EP2008/001777, filed Mar. 6, 2008, which claims benefit of German Application No. 10 2007 013 273.7, filed Mar. 16, 2007.

The present invention concerns a process for producing a container having at least one layer and a top layer, wherein the layer contains polycarbonate and the top layer contains polyarylethersulfone or polyarylsulfone, characterised in that
a) polycarbonate is melted on an extruder at 230-320° C.,
b) polyarylethersulfone or polyarylsulfone is melted on a further extruder,
c) the melts obtained from steps a) and b) are shaped by coextrusion into a tube, which is then enclosed in a mould,
d) the extrudate is inflated inside the mould and pressed against the wall of the mould, forming the shape of the container, and
e) the container obtained from d) is trimmed and cooled,
such containers and the use of the containers as bottles or medical devices.

Multi-wall sheets or solid sheets are generally provided on one or two sides with UV coextruded coatings on the outer sides to protect them from damage (e.g. yellowing due to UV light). However, other multi-layer products are also protected in this way from damage by UV light. By contrast, the application of a coating to protect against cleaning agents or chemicals is not described.

EP-A 0110 221 describes sheets comprising two layers of polycarbonate, one layer containing at least 3 wt. % of a UV absorber. According to EP-A 0110 221 these sheets can be produced by coextrusion.

EP-A 0320 632 describes moulded articles consisting of two layers of thermoplastic material, preferably polycarbonate, one layer containing special substituted benzotriazoles. According to EP-A 0320 632 these moulded articles can be produced by coextrusion.

EP-A 0 247 480 describes multi-layer sheets in which in addition to a layer of a thermoplastic material a layer of branched polycarbonate is present, the polycarbonate layer containing special substituted benzotriazoles. Production by coextrusion is likewise disclosed.

EP-A 0500 496 describes polymer compositions which are stabilised with special triazines against UV light and their use as an outer layer in multi-layer systems. Polycarbonate, polyester, polyacetals, polyphenylene oxide and polyphenylene sulfide are described as polymers.

Multi-layer products consisting of various thermoplastics with a second layer of a fluoropolymer are described in U.S. 362,637.

Water bottles, such as 5-gallon bottles for example, are not produced with a multi-layer construction according to the prior art (described for example in DE 19943642, DE 19943643, EP-A 0411433). The same applies to reusable milk bottles or conventional 1-liter bottles.

U.S. Pat. No. 4,816,093 discloses a process for producing a container from laminate layers, which is produced by coextruding two non-adhesive thermoplastics. The thermoplastic laminate layers should, however, be able to be separated according to the invention.

Polycarbonate containers are produced by extrusion blow moulding or injection blow moulding, for example.

In extrusion blow moulding granules are generally melted with a single-screw extruder and shaped through a die to form a free-standing tube, which is then enclosed in a blow mould, which pinches the tube together at the lower end. The tube is inflated inside the mould to give it the desired shape. After a cool-down time the mould is opened and the blow moulded article can be removed (for a precise description see for example Brinkschröder, F. J. "Polycarbonate" in Becker, Braun, Kunststoff-Handbuch, Volume 3/1, Polycarbonate, Polyacetale, Polyester, Celluloseester, Carl Hanser Verlag, Munich, Vienna 1992, pages 257-264).

For extrusion blow moulding it is advantageous to use a highly pseudoplastic polycarbonate to ensure a high melt stability. Branched polycarbonates are particularly pseudoplastic and are thus especially suitable for blow moulding.

Injection blow moulding is a combination of injection moulding and blow moulding.

The Process Comprises Three Stages:
1. Injection moulding the parison in the plastic temperature range of the polycarbonate
2. Inflating the parison in the thermoplastic range of the polycarbonate (the core of the injection mould is also the blowing mandrel)
3. Stripping the blow moulded article and optionally cooling the blowing mandrel with air (described more precisely in for example Anders, S., Kaminski, A., Kappenstein, R. "Polycarbonate" in Becker, Braun, Kunststoff-Handbuch, Volume 3/1, Polycarbonate, Polyacetale, Polyester, Celluloseester, Carl Hanser Verlag, Munich, Vienna 1992, pages 223-225).

Not all prior art products or containers achieve satisfactory results in every respect, however, particularly as regards longterm stability. The storage of water in these containers or their repeated cleaning with aqueous/alkaline media can lead to the premature failure of such moulded articles by bursting or cracking if they are subjected to mechanical loading in use or during cleaning. A particular mechanical loading can occur, for example, if a bottle that has been cleaned repeatedly is dropped on the floor.

In the patent literature of the prior art, no mention is made of thermoplastic-coated polycarbonate multi-layer products as a means of increasing the mechanical strength of polycarbonate containers for aqueous media in use.

Starting from the prior art the object is to provide a process with which multi-layer containers can be produced, such as for example bottles or medical devices, which should be able to be sterilised with superheated steam, which in comparison to the prior art exhibit both improved mechanical long-term stability in aqueous media and improved resistance to organic media and cleaning agents. The products should exhibit the improved properties even at elevated contact temperatures in both the acid and the alkaline range. In particular the products should exhibit improved mechanical properties under loading in use.

This object was surprisingly achieved by a process for producing a container having at least one layer and a top layer, wherein the layer contains polycarbonate and the top layer contains polyarylethersulfone or polyarylsulfone, characterised in that a) polycarbonate is melted on an extruder at 230-320° C., b) polyarylethersulfone or polyarylsulfone is melted on a further extruder, c) the melts obtained from steps a) and b) are shaped by coextrusion into a tube, which is then enclosed in a mould, d) the extrudate is inflated inside the mould and pressed against the wall of the mould, forming the shape of the container, and e) the container obtained from d) is trimmed and cooled.

The top layer made from polyarylsulfone or polyarylethersulfone is to be applied to the containers on the side in contact with the medium against which the polycarbonate is to be protected. In containers, the protective top layer is therefore generally an internal protective layer.

The containers obtained by the process according to the invention are superior to those of the prior art, such as e.g. standard polycarbonate containers. This applies in particular in respect of the improved mechanical stability in long-term contact with aqueous media. There is also an advantage with regard to cleaning of the containers, i.e. the moulded article, such as a bottle for example, in which the protective polyarylsulfone or polyarylethersulfone top layer forms the internal layer, can undergo more cleaning cycles than a container corresponding to the prior art.

Surprisingly it was found that after extended use or after cleaning operations, these moulded articles have a higher puncture resistance than conventional polycarbonate moulded articles. This was previously unknown and represents an advantage both in use and in cleaning operations. The usage and cleaning phases, in which the containers are exposed to mechanical loading, alternate cyclically and thus have a strong influence on the service life of the containers.

The present application also provides extrusion blow moulded multi-layer systems wherein the polyarylsulfone or polyarylethersulfone has the general formula I or II as a repeating unit:

  (I)

  (II)

in which A and B can stand for optionally substituted aromatic radicals. The aromatic radicals consist of 6 to 40 C atoms, preferably 6 to 21 C atoms, containing one or more optionally condensed aromatic nuclei, wherein the nuclei can optionally contain heteroatoms. These aromatic nuclei can optionally be substituted with linear or branched or cycloaliphatic C1 to C15 radicals or halo atoms. The aromatic nuclei can be linked via carbon bonds or via heteroatoms as a binding link.

A can stand for example for phenyl, alkylphenyl, alkoxyphenyl or for corresponding chlorine- or fluorine-substituted derivatives, preferably for unsubstituted phenyl radicals.

B preferably stands for bisphenols which are based on the general formula (III)

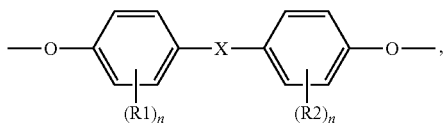  (III)

in which R1 and R2 are the same or different and mutually independently stand for hydrogen, halogen, C1-C6 alkyl or C1-C6 alkoxy, preferably for hydrogen, fluorine, chlorine or bromine, n stands for a whole number from 1 to 4, preferably 1, 2, 3, in particular 1 or 2, x stands for a chemical —CO—, —O—, —S—, —SO2— bond, for alkylene, alkylidene, preferably C1-C10 alkylidene or cycloalkylene, wherein the last three cited radicals can be substituted by substituents chosen from halogen, in particular fluorine, chlorine, bromine, optionally fluorine-, chlorine-, bromine-, C1-C4 alkyl- or C1-C4 alkoxy-substituted phenyl or naphthyl, and wherein cycloalkylene can additionally also be substituted by C1-C6 alkyl.

Where X stands for cycloalkylene, X preferably stands for a radical having formula (IV)

  (IV)

in which Y stands for carbon,

R2 and R3 for each Y mutually independently stand for hydrogen, C1-C6 alkyl, particularly preferably for hydrogen or C1-C4 alkyl, in particular hydrogen, methyl or ethyl, and m stands for a whole number from 3 to 12, preferably 4 to 8, in particular 4 or 5.

B preferably stands for structural units derived from:

Hydroquinone, resorcinol, dihydroxydiphenyl, bis(hydroxyphenyl) alkanes, bis(hydroxyphenyl)cycloalkanes, bis(hydroxyphenyl) sulfides, bis(hydroxyphenyl)ethers, bis(hydroxyphenyl) ketones, 4,4-bis(hydroxyphenylsulfone), bis(hydroxyphenyl) sulfoxides, α,α-bis(hydroxyphenyl) diisopropyl benzenes, and alkylated, ring-alkylated and ring-halogenated compounds thereof.

Preferred structural units are derived from hydroquinone, resorcinol, 4,4'-dihydroxydiphenyl, 4,4-bis(hydroxyphenyl) sulfone, 2,2-bis-(4-hydroxyphenyl)-1-phenylpropane, 1,1-bis-(4-hydroxyphenyl)phenylethane, 2,2-bis-(4-hydroxyphenyl)propane, 2,4-bis-(4-hydroxyphenyl)-2-methylbutane, 1,3-bis-[2-(4-hydroxyphenyl)-2-propyl]benzene (bisphenol M), 2,2-bis-(3-methyl-4-hydroxyphenyl)propane, bis-(3,5-dimethyl-4-hydroxyphenyl)methane, 2,2-bis-(3,5-dimethyl-4-hydroxyphenyl)propane, bis-(3,5-dimethyl-4-hydroxyphenyl)sulfone, 2,4-bis-(3,5-dimethyl-4-hydroxyphenyl)-2-methylbutane, 1,3-bis-[2-(3,5-dimethyl-4-hydroxyphenyl)-2-propyl]benzene and 1,1-bis-(4-hydroxyphenyl)-3,3,5-trimethylcyclohexane (bisphenol TMC).

Particularly preferred structural units are derived from hydroquinone, 4,4-bis(hydroxyphenyl)sulfone, 4,4'-dihydroxydiphenyl, 1,1-bis-(4-hydroxyphenyl)phenylethane, 2,2-bis-(4-hydroxyphenyl)propane, 2,2-bis-(3,5-dimethyl-4-hydroxyphenyl)propane, 1,1-bis-(4-hydroxyphenyl)cyclohexane and 1,1-bis-(4-hydroxyphenyl)-3,3,5-trimethylcyclohexane (bisphenol TMC).

These and other suitable diphenols are described for example in U.S. Pat. Nos. 2,999,835, 3,148,172, 2,991,273, 3,271,367, 4,982,014 and 2,999,846, in German laid-open applications 1 570 703, 2 063 050, 2 036 052, 2 211 956 and 3 832 396, French patent 1 561 518, in the monograph "H. Schnell, Chemistry and Physics of Polycarbonates, Interscience Publishers, New York 1964, p. 28 ff; p. 102 ff", and in "D. G. Legrand, J. T. Bendler, Handbook of Polycarbonate Science and Technology, Marcel Dekker, New York 2000, p. 72 ff".

Particularly preferred polymers having formula (I) or (II) are for example the polysulfone of bisphenol A (commercially available under the name Udel TM® from Amoco, Chicago, USA, or Ultrason R® from BASF), a polyethersulfone synthesised from phenyl units (commercially available under the name Ultrason E® from BASF and SumikaExcel® from Sumitomo, Japan), the polyarylethersulfone with 4,4'-dihydroxydiphenyl structures from Amoco (Radel R®) or polysulfones with TMC bisphenol structures according to DE-OS 3 833 385. All cited sulfone polymer grades can optionally be used in different grades with regard to molecular weight. The selection in this respect is determined by the desired molecular weights of the end products. The sulfone polymers generally have average molecular weights (weight average) of 5000 to 100,000, preferably 3000 to 75,000, measured by gel permeation chromatography (GPC) against a polystyrene standard. Polysulfone based on bisphenol A is particularly preferred.

These polymers can be produced by processes familiar to the person skilled in the art, such as e.g. by base-catalysed polycondensation from corresponding aromatic bisphenols and halogen-substituted carbonic acid derivatives.

The present invention provides the use of polyarylsulfone or polyarylethersulfone to produce multi-layer containers, for example coextrudates such as multi-layer containers, these multi-layer moulded articles themselves, and also processes to produce these multi-layer moulded articles by coextrusion or extrusion blow moulding, and the use of compositions containing polyarylsulfones or polyarylethersulfones as described above that are suitable for coating purposes, wherein at least one layer consists of polycarbonate.

The multi-layer product according to the invention has numerous advantages over products corresponding to the prior art. For example, it has the advantage that this product has a higher mechanical resistance to aqueous media in use and to cleaning media. The long-term stability of the moulded articles according to the invention is markedly improved. The product also has improved mechanical properties, which advantage in particular increases the service life.

A further advantage lies in the ability to produce these articles from commercially available materials. As described above, the articles according to the invention can be produced by the coextrusion process, such as e.g. by coextrusion blow moulding. This gives rise to advantages as compared with a product produced by surface coating, for example. For instance, coextrusion does not require the evaporation of solvents, as is the case with surface coating, for example.

Such multi-layer containers are preferred according to the invention in which the coex layer is 1 to 5000 μm thick, preferably 5 to 2500 μm and particularly preferably 10 to 500 μm.

A further preferred embodiment is a three-layer container consisting of a polycarbonate base layer and two overlying layers, each of which consists of the same or different polyarylsulfones or polyarylethersulfones or blends thereof. In a preferred embodiment the polyarylsulfone or polyarylethersulfone top layer is on the inside of the container.

Likewise preferred as an embodiment of the present invention are various types of containers such as bottles (e.g. 5-gallon bottles, baby bottles, milk bottles, water bottles or reusable bottles in general) and medical devices.

Containers within the meaning of the present invention can be used for the packaging, storage or transport of liquids, solids or gases. Containers for the packaging, storage or transport of liquids (liquid containers) are preferred, containers for the packaging, storage or transport of water (water bottles) being particularly preferred. Containers for the packaging of food products are likewise preferred.

Containers within the meaning of the invention are hollow bodies having a volume of preferably 0.1 to 50, particularly preferably 0.5 to 50 liters. Particularly preferred are water bottles having a volume of 3 to 5 gallons. The containers have an empty weight of preferably 0.1 g to 3000 g, by preference 50 g to 2000 g and particularly preferably 650 to 900 g. The wall thicknesses of the containers are preferably 0.2 to 5 mm, preferably 0.5 to 4 mm. Containers within the meaning of the present invention have a length of preferably 5 mm to 2000 mm, by preference 100 to 1000 mm. The containers have a maximum circumference of preferably 100 mm to 2500 mm. The wall thickness of the neck of the containers preferably varies from 0.5 to 10 mm, particularly preferably from 1 mm to 10 mm and most particularly preferably from 5 to 7 mm. Containers within the meaning of the invention can be any shape; they can for example be round, oval or polygonal, with e.g. 3 to 12 sides. Round, oval and hexagonal shapes are preferred.

The containers according to the invention are preferably produced by extrusion blow moulding or by injection blow moulding.

In a preferred embodiment of the production of the containers according to the invention the polycarbonates according to the invention are processed on extruders having a smooth or grooved, preferably a smooth feed section.

The drive power of the extruder is chosen in accordance with the screw diameter. By way of example, with a screw diameter of 60 mm the drive power of the extruder is approx. 30-40 kW, with a screw diameter of 90 mm it is approx. 60 to 70 kW.

The universal three-zone screws conventionally used in the processing of industrial thermoplastics are suitable.

For the production of containers up to 1 liter in volume, a screw diameter of 50 to 60 mm is preferred. For the production of larger containers up to 20 liters in volume, a screw diameter of 70 to 100 mm is preferred. The length of the screws is preferably 20 to 25 times the diameter of the screw.

In the blow moulding process the blow mould is preferably heated to 20-60° C. in order to obtain a brilliant and high-quality container surface.

The floor area and jacket area of the mould (corresponding to the base and the walls of the bottle-shaped container) can be heated separately in order to ensure a uniform and effective temperature control of the blow mould.

The blow mould is preferably closed with a pinching force of 1000 to 1500 N per cm of pinch-off weld length.

The extrudate can be inflated by means of a system which is capable of raising the pressure in the mould, for example. This system can preferably be a compressed air line.

Before being processed, the polycarbonate according to the invention is preferably dried so that the optical quality of the containers is not adversely affected by streaks or bubbles and so that the polycarbonate does not undergo hydrolytic degradation during processing. The residual moisture after drying is preferably less than 0.1 wt. %. A drying temperature of approx. 120° C. is preferred. Dry air dryers are preferred for drying the polycarbonate.

The polysulfone or polyethersulfone is dried for example in a circulating air drying oven at 120° C.

The preferred melt temperature for the processing of the polycarbonate necessary for producing the articles is 230-320° C. In another preferred embodiment the melt temperature is 300-320° C. The preferred temperatures of the main extruder are 230-320° C. behind the feed section.

The containers according to the invention can be used for the packaging, storage or transport of liquids, solids or gases. The embodiment as containers which are used for example for the packaging, storage or transport of liquids is preferred.

A preferred embodiment of the invention is that in which the containers consist of branched polycarbonate, characterised in that the branched polycarbonate contains 1,1,1-tris-(4-hydroxyphenyl)ethane or isatin bis-cresol as branching agent, alkyl phenols being used as chain terminators in the production of the branched polycarbonate, and in which the container is a water bottle.

A preferred embodiment of the invention is that in which the containers consist of branched polycarbonate, characterised in that the branched polycarbonate contains 1,1,1-tris-(4-hydroxyphenyl)ethane or isatin bis-cresol as branching agent, phenol or tert-butyl phenol being used in the production of the branched polycarbonate, and in which the polycarbonate has a melt viscosity of 5500 to 8000 Pas at 260° C. and a shear rate of 10 s−1 and a melt viscosity of 880 to 1500 Pas at 260° C. and a shear rate of 1000 s−1, determined in each case in accordance with ISO 11443, and a melt flow index, measured in accordance with ISO 1133, of <3.5 g/10 min, and in which the container is a water bottle.

A particularly preferred embodiment of the invention is further that in which the containers consist of branched polycarbonate, characterised in that the branched polycarbonate contains 1,1,1-tris-(4-hydroxyphenyl)ethane or isatin bis-cresol as branching agent and phenol or p-tert-butyl phenol or p-cumyl phenol and/or p-isooctyl phenol are used in the production of the branched polycarbonate, and in which the container is a water bottle.

In a particular embodiment the multi-layer containers are transparent.

Both the base material and the protective layer in the multi-layer moulded articles according to the invention can contain additives.

The protective layer and/or the PC layer can for example contain mould release agents.

The layers can also contain other conventional processing aids, in particular flow promoters and the stabilisers conventionally used in PC, in particular heat stabilisers, and dyes, optical brighteners and inorganic pigments.

Suitable polycarbonates are for example homopolycarbonates, copolycarbonates and thermoplastic polyester carbonates.

Regarding the production of polycarbonates by the interfacial polycondensation process, reference is made by way of example to H. Schnell, Chemistry and Physics of Polycarbonates, Polymer Reviews, Vol. 9, Interscience Publishers, New York 1964 p. 33 ff. and to Polymer Reviews, Vol. 10, "Condensation Polymers by Interfacial and Solution Methods", Paul W. Morgan, Interscience Publishers, New York 1965, chapter VIII, p. 325.

In addition, the polycarbonates according to the invention can also be produced from diaryl carbonates and diphenols by the known polycarbonate process in the melt, known as the melt interesterification process, as described for example in WO-A 01/05866 and WO-A 01/05867. Interesterification processes (acetate process and phenyl ester process) are also described for example in U.S. Pat. No. 3,494,885, 4,386,186, 4,661,580, 4,680,371 and 4,680,372, in EP-A 26 120, 26 121, 26 684, 28 030, 39 845, 39 845, 91 602, 97 970, 79 075, 14 68 87, 15 61 03, 23 49 13 and 24 03 01, and in DE-A 14 95 626 and 22 32 977. The use according to the invention of phenolic compounds with o- and/or m-substituents as chain terminators is also possible in these processes.

Production of the polycarbonates preferably takes place by the interfacial polycondensation process or by the melt interesterification process and is described below by reference to the interfacial polycondensation process by way of example.

Suitable diphenols for production of the polycarbonates for use according to the invention are for example hydroquinone, resorcinol, dihydroxydiphenyl, bis(hydroxyphenyl) alkanes, bis(hydroxyphenyl)cycloalkanes, bis(hydroxyphenyl) sulfides, bis(hydroxyphenyl)ethers, bis(hydroxyphenyl) ketones, bis(hydroxyphenyl) sulfones, bis(hydroxyphenyl) sulfoxides, α,α'-bis(hydroxyphenyl) diisopropyl benzenes, as well as alkylated, ring-alkylated and ring-halogenated compounds thereof and 2-hydrocarbyl-3,3-bis-(4-hydroxyaryl) phthalimidines, in particular 2-phenyl-3,3-bis-(4-hydroxyphenyl) phthalimidine.

Preferred diphenols are 4,4'-dihydroxydiphenyl, 2,2-bis-(4-hydroxyphenyl)-1-phenylpropane, N-phenyl isatin bisphenol, 1,1-bis-(4-hydroxyphenyl)phenylethane, 2,2-bis-(4-hydroxyphenyl)propane, 2,4-bis-(4-hydroxyphenyl)-2-methylbutane, 1,3-bis-[2-(4-hydroxyphenyl)-2-propyl]benzene (bisphenol M), 2,2-bis-(3-methyl-4-hydroxyphenyl) propane, 2-phenyl-3,3-bis-(4-hydroxyphenyl)phthalimidine, bis-(3,5-dimethyl-4-hydroxyphenyl)methane, 2,2-bis-(3,5-dimethyl-4-hydroxyphenyl)propane, bis-(3,5-dimethyl-4-hydroxyphenyl)sulfone, 2,4-bis-(3,5-dimethyl-4-hydroxyphenyl)-2-methylbutane, 1,3-bis-[2-(3,5-dimethyl-4-hydroxyphenyl)-2-propyl]benzene and 1,1-bis-(4-hydroxyphenyl)-3,3,5-trimethylcyclohexane (bisphenol TMC) and 2-hydrocarbyl-3,3-bis-(4-hydroxyaryl) phthalimidines, in particular 2-phenyl-3,3-bis-(4-hydroxyphenyl) phthalimidine.

Particularly preferred diphenols are 4,4'-dihydroxydiphenyl, 1,1-bis-(4-hydroxyphenyl)phenylethane, 2,2-bis-(4-hydroxyphenyl)propane, 2,2-bis-(3,5-dimethyl-4-hydroxyphenyl)propane, 1,1-bis-(4-hydroxyphenyl)cyclohexane and 1,1-bis-(4-hydroxyphenyl)-3,3,5-trimethylcyclohexane (bisphenol TMC).

These and other suitable diphenols are described for example in U.S. Pat. Nos. 2,999,835, 3,148,172, 2, 991,273, 3,271,367, 4,982,014 and 2,999,846, in German laid-open applications 1 570 703, 2 063 050, 2 036 052, 2 211 956 and 3 832 396, French patent 1 561 518, in the monograph "H. Schnell, Chemistry and Physics of Polycarbonates, Interscience Publishers, New York 1964, p. 28 ff; p. 102 ff", and in "D. G. Legrand, J. T. Bendler, Handbook of Polycarbonate Science and Technology, Marcel Dekker, New York 2000, p. 72 ff".

In the case of homopolycarbonates only one diphenol is used, in the case of copolycarbonates several diphenols are used, wherein the bisphenols used, as is the case with all other chemicals and auxiliary substances added to the synthesis, can of course be contaminated with impurities deriving from their own synthesis, handling and storage, although it is desirable to work with raw materials that are as clean as possible.

The diphenols can be used both alone and mixed together; both homopolycarbonates and copolycarbonates are included in the invention.

The monofunctional chain terminators according to the invention necessary for regulating the molecular weight can be phenols or alkyl phenols, in particular phenol, p-tert-butyl phenol, iso-octyl phenol, cumyl phenol, chloroformic acid esters thereof or acid chlorides of monocarboxylic acids or mixtures of these chain terminators, which are either added to the reaction with the bisphenolate or bisphenolates or are added at any point of the synthesis, provided there are still phosgene or chloroformic acid end groups present in the reaction mixture or, in the case of acid chlorides and chloroformic acid esters as chain terminators, as long as enough phenolic end groups of the polymer being formed are available. However, the chain terminator(s) are preferably added after phosgenation at a point where or at a time when no more phosgene is present but catalyst is still being added, or they are added before the catalyst, together with the catalyst or in parallel thereto.

Any branching agents or mixtures of branching agents to be used are added to the synthesis in the same way, but conventionally before the chain terminators. Trisphenols, quaternary phenols or acid chlorides of tricarboxylic or tetracarboxylic acids are conventionally used, and also mixtures of polyphenols or acid chlorides.

Some of the compounds having three or more than three phenolic hydroxyl groups that can be used are for example phloroglucinol, 4,6-dimethyl-2,4,6-tri-(4-hydroxyphenyl) heptene-2,4,6-dimethyl-2,4,6-tri-(4-hydroxyphenyl)heptane, 1,3,5-tri-(4-hydroxyphenyl)benzene, 1,1,1-tri-(4-hydroxyphenyl)ethane, tri-(4-hydroxyphenyl)phenylmethane, 2,2-bis-(4,4-bis-(4-hydroxyphenyl)cyclohexyl]propane, 2,4-bis-(4-hydroxyphenyl isopropyl)phenol and tetra-(4-hydroxyphenyl)methane.

Some of the other trifunctional compounds are 2,4-dihydroxybenzoic acid, trimesic acid, cyanuric chloride and 3,3-bis-(3-methyl-4-hydroxyphenyl)-2-oxo-2,3-dihydroindole. Preferred branching agents are 3,3-bis-(3-methyl-4-hydroxyphenyl)-2-oxo-2,3-dihydroindole and 1,1,1-tri-(4-hydroxyphenyl)ethane.

The aromatic polycarbonates of the present invention have weight-average molecular weights $M_w$ (determined by gel permeation chromatography and calibration with polystyrene standard) of between 5000 and 200,000, preferably between 10,000 and 80,000 and particularly preferably between 48,000 and 62,500 g/mol.

The relative solution viscosities are correspondingly between 1.10 and 1.60, measured in methylene chloride (0.5 g of polycarbonate in 100 ml of methylene chloride at 23° C.).

The homopolycarbonate based on bisphenol A is particularly preferred. Branched homopolycarbonates based on bisphenol A are likewise particularly preferred.

Conventional additives for these thermoplastics, such as fillers, UV stabilisers, heat stabilisers, antistatic agents and pigments, can also be added to the polycarbonates in the conventional quantities; the demoulding behaviour, flow properties and/or flame resistance can optionally also be improved by the addition of external mould release agents, flow control agents and/or flame retardants (e.g. alkyl and aryl phosphites, phosphates, phosphanes, low-molecular-weight carboxylic acid esters, halo compounds, salts, chalk, silica flour, glass and carbon fibres, pigments and combinations thereof. Such compounds are described for example in WO 99/55772, p. 15-25, and in "Plastics Additives", R. Gächter and H. Müller, Hanser Publishers 1983).

Suitable additives are described for example in "Additives for Plastics Handbook, John Murphy, Elsevier, Oxford 1999", in the "Plastics Additives Handbook, Hans Zweifel, Hanser, Munich 2001".

Suitable antioxidants or heat stabilisers are, for example:
Alkylated monophenols
Alkylthiomethyl phenols
Hydroquinones and alkylated hydroquinones
Tocopherols
Hydroxylated thiodiphenyl ethers
Alkylidene bisphenols
O-, N- and S-benzyl compounds
Hydroxybenzylated malonates
Aromatic hydroxybenzyl compounds
Triazine compounds
Acylaminophenols
Esters of β-(3,5-di-tert-butyl-4-hydroxyphenyl) propionic acid
Esters of β-(5-tert-butyl-4-hydroxy-3-methylphenyl) propionic acid
Esters of β-(3,5-dicyclohexyl-4-hydroxyphenyl) propionic acid
Esters of 3,5-di-tert-butyl-4-hydroxyphenyl acetic acid
Amides of β-(3,5-di-tert-butyl-4-hydroxyphenyl) propionic acid Suitable thio synergists
Secondary antioxidants, phosphites and phosphonites
Benzofuranones and indolinones Organic phosphites, phosphonates and phosphanes are preferred, mostly those in which the organic radicals consist wholly or partly of optionally substituted aromatic radicals.

Suitable as complexing agents for heavy metals and for neutralising alkali traces are o-/m-phosphoric acids, wholly or partially esterified phosphates or phosphites.

The following are suitable as light stabilisers (UV absorbers):
2-(2'-hydroxyphenyl)benzotriazoles, 2-hydroxybenzophenones, esters of substituted and unsubstituted benzoic acids, acrylates, sterically hindered amines, oxamides, 2,8,2-(2-hydroxyphenyl)-1,3,5-triazines, and polysubstituted triazines such as e.g. 2-[2-hydroxy-4-(2-ethylhexyl)oxy]phenyl-4,6-di-(4-phenyl)phenyl-1,3,5-triazine (CAS No. 204583-39-1);
substituted benzotriazoles or substituted triazines are preferred.

Polypropylene glycols alone or in combination with e.g. sulfones or sulfone amides as stabilisers can be used to prevent damage from gamma rays.

These and other stabilisers can be used alone or in combinations and added to the polymer in the cited forms.

Processing aids such as mould release agents, mostly derivatives of long-chain fatty acids, can also be added. Pentaerythritol tetrastearate and glycerol monostearate, for example, are preferred. They are used alone or in a mixture, preferably in an amount of 0.02 to 1 wt. %, based on the mass of the composition.

Suitable flame-retardant additives are phosphate esters, i.e. triphenyl phosphate, resorcinol diphosphoric acid esters, bromine-containing compounds, such as brominated phosphoric acid esters, brominated oligocarbonates and polycarbonates, and preferably salts of fluorinated organic sulfonic acids.

Suitable impact modifiers are butadiene rubber with grafted styrene-acrylonitrile or methyl methacrylate, ethylene-propylene rubbers with grafted maleic anhydride, ethyl and butyl acrylate rubbers with grafted methyl methacrylate or styrene-acrylonitrile, interpenetrating siloxane and acrylate networks with grafted methyl methacrylate or styrene-acrylonitrile.

In addition, dyes, such as organic dyes or pigments or inorganic pigments, IR absorbers, can be added individually, in a mixture or in combination with stabilisers, glass fibres, (hollow) glass beads, inorganic fillers.

The additives can be present both in the base layer and in the coex layer(s). Different additives in differing concentrations can be present in each layer.

All moulding compositions used to produce the multi-layer products according to the invention, their constituents and solvents, can be contaminated with corresponding impurities from their production and storage, the objective being to work with starting materials that are as clean as possible. The starting materials can optionally have been filtered.

Mixing of the individual constituents in the moulding compositions can take place in a known manner either successively or simultaneously and both at room temperature and at elevated temperature.

Incorporation of the additives into the moulding compositions for the products according to the invention, in particular the aforementioned additives, preferably takes place in a known manner by mixing polymer granules with the additives at temperatures of 200 to 330° C. in conventional units such as internal compounders, single-screw extruders and twin-shaft extruders, for example by melt compounding or melt extrusion or by mixing the solutions of the polymer with solutions of the additives and then evaporating the solvents in a known manner. The proportion of additives in the moulding compositions can vary within broad limits. It is governed by the desired properties of the moulding compositions. The total proportion of additives in the moulding composition is preferably up to around 20 wt. %, by preference 0.2 to 12 wt. %, based on the weight of the moulding composition.

Coextrusion as such is known from the literature (see for example EP-A 0110221 and EP-A 0110238). In the present case it is preferable to proceed as follows: the extruders for producing the core layers and top layers are connected to a coextrusion adapter. The adapter is constructed in such a way that the melt forming the top layers is applied as a thin layer adhering to the melt of the core layer. The multi-layer melt strand produced in this way is then formed into the desired shape in the adjacently connected die.

Multi-layer composites can also be produced according to the prior art by extrusion coating or coextrusion blow moulding.

In a particularly preferred embodiment the following process for producing multi-layer products is used:

Polycarbonates containing bisphenol A with a molecular weight (weight average) of between $M_w$=48,000 and $M_w$=62,500 (weight average determined by gel permeation chromatography and polystyrene standard; this roughly corresponds to $M_w$=27,100 to $M_w$ 36,000 g/mol determined by gel permeation chromatography with polycarbonate calibration) are preferably used. The polycarbonate is either linear or branched. Branched polycarbonate is preferably used. The polycarbonate is melted on an extruder at 230-320° C.

In a further extruder a polyethersulfone with an average molecular weight of 3000-75,000 (weight average determined by gel permeation chromatography and polystyrene standard) is melted at 280-350° C. Both polymer melts are passed through a coextrusion die and shaped into a tube. A compressed air line is attached in the middle of the tube. The tube is preferably introduced from the top down into a mould having the desired bottle shape. The extrudate is inflated via the compressed air line and pressed against the wall of the mould. The mould temperature is preferably 20-60° C. The mould then opens and the finished coextrudate is trimmed.

The invention is illustrated in more detail by the following examples, without being restricted thereto. The examples according to the invention simply reflect preferred embodiments of the present invention.

EXAMPLES

Production of Bottle Types 1 and 2

Example 1

Bottle type 1 (according to the invention):

Production of a co-blow moulded bottle comprising Makrolon 1239® (a high-viscosity crosslinked food-grade polycarbonate based on bisphenol A from Bayer MaterialScience, Germany, with an MVR as defined in ISO 1133 (300° C., 1.2 kg) of 3.0 cm3/10 min) on the outside of the bottle and Udel P3500® (a high-molecular-weight polysulfone based on diphenylenesulfone units and bisphenol A units, from Solvay Advanced Polymers) on the inside of the bottle.

A plant consisting of a main extruder (KEB4/13-S60/19, Kautex, Germany) and an ancillary extruder (35.6 ST2, Stork, Germany) is used. Makrolon 1239® is conveyed in the main extruder with a three-zone screw having 6 different heating zones measuring 60 mm in diameter and with a processing length of 25×D. The ancillary extruder with a three-zone screw having 4 different heating zones and a processing length of 25×D conveys Udel P3500®, The melts are passed via a crosshead to a coex adapter, which is fitted with a circular die measuring 40 mm in diameter and a mandrel with a diameter of 34 mm. From the die the molten tube passes into the receiving section of the bottle mould, which is at the temperature specified in Table 1. The mould for producing a square 1-liter bottle surrounds the molten tube, which is separated from the rest of the strand by a hot wire. A mandrel moves into the heated mould and blows the molten tube against the inner wall of the mould. The finished bottle cools and is placed in a storage device. The process parameters are summarised in Table 1.

TABLE 1

|  | Main extruder (base material Makrolon 1239 ®) | Ancillary extruder (coex material Udel 3500 ®) |
|---|---|---|
| Process parameters Heating zones |  |  |
| Extruder Z1 | 200° C. | 280° C. |
| Extruder Z2 | 255° C. | 320° C. |
| Extruder Z3 | 260° C. | 330° C. |
| Extruder Z4 | 260° C. | 330° C. |
| Extruder Z5 | 265° C. | — |
| Extruder Z6 | 265° C. | — |
| Flange Z7 | 265° C. | 330° C. |
| Crosshead Z8 | 275° C. |  |
| Coex adapter Z9 | 295° C. |  |
| Die Z10 | 295° C. |  |
| Process parameters Measured values |  |  |
| Extruder speed | 15 rpm | 10 rpm |
| Composition temperature | 278° C. | 331° C. |
| Composition pressure | 43 bar | 28 bar |
| Mould temperature | 40° C. |  |
| Throughput | 20 kg/h | 1.5 kg/h |

Bottle geometry: square 1-litre bottle

Example 2

Bottle Type 2 (Comparison):

Production of a co-blow moulded bottle comprising Makrolon 1239® from Bayer MaterialScience, Germany, on the outside of the bottle and Makrolon 1239® on the inside of the bottle.

The bottle is produced as described in Example 1. The process parameters listed in Table 2 were used in this process.

TABLE 2

|  | Main extruder (base material Makrolon 1239 ®) | Ancillary extruder (coex material Makrolon 1239 ®) |
|---|---|---|
| Process parameters Heating zones |  |  |
| Extruder Z1 | 200° C. | 190° C. |
| Extruder Z2 | 255° C. | 240° C. |
| Extruder Z3 | 260° C. | 255° C. |
| Extruder Z4 | 260° C. | 260° C. |
| Extruder Z5 | 265° C. | — |
| Extruder Z6 | 265° C. | — |
| Flange Z7 | 265° C. | 260° C. |
| Crosshead Z8 | 275° C. |  |

TABLE 2-continued

|  | Main extruder (base material Makrolon 1239 ®) | Ancillary extruder (coex material Makrolon 1239 ®) |
|---|---|---|
| Coex adapter Z9 | 295° C. | |
| Die Z10 | 295° C. | |
| Process parameters Measured values | | |
| Extruder speed | 15 rpm | 10 rpm |
| Composition temperature | 278° C. | 270° C. |
| Composition pressure | 43 bar | 38 bar |
| Mould temperature | 40° C. | |
| Throughput | 20 kg/h | 1.5 kg/h |

Bottle geometry: square 1-litre bottle

Examination of Bottle Types 1 and 2
Test of the Mechanical Stability of Bottle Types 1 and 2 and Test of the Optical Properties after Exposure to Cleaning Solution:

The co-blow moulded bottles are filled with cleaning solution and stored for several days. Testing of the mechanical stability after rinsing and drying the bottles is performed by means of a puncture test in accordance with ISO 6603-2 with oil. In this test an impactor hits the specimen at right angles at a constant speed and punctures it. The test is performed as follows:

A puncture test in accordance with ISO 6603-2 is performed from the outside in on pieces measuring 40×40 mm² (cut-out specimen) and with a thickness of approx. 1 mm. The weight of the falling body is 23.17 kg. The speed is 4.42 m/s. The drop height is 0.996 m. The temperature during the measurement is 21° C. A total of 7 tests were performed on various extrudates (different parts of the bottle).

The haze was determined in accordance with ASTM D 1703 on a piece of bottle measuring 40×40 mm.

Example 3

Bottle Type 1 (According to the Invention):

A cleaning solution is introduced into a bottle from Example 1. This cleaning solution consists of 10.0% 2-isopropanol, 10.0% sodium hydroxide and 0.1% sodium dodecyl sulfate dissolved in Millipore water. The bottle is stored for 10 days at 70° C.

The bottle is then rinsed repeatedly with water and dried.

A haze of 9% was measured in accordance with ASTM D 1703. The starting value was 5% (ΔHaze: 4%).
Puncture Test in Accordance with ISO 6603-2:

A total of 7 tests were performed on various extrudates (different parts of the bottle). The mean value for the penetration energy was 23.95 J. The mean value for the maximum force absorption was 2824 N.

Example 4

Bottle Type 2 (Comparison):

A cleaning solution is introduced into a bottle from Example 2. This cleaning solution consists of 10.0% 2-isopropanol, 10.0% sodium hydroxide and 0.1% sodium dodecyl sulfate dissolved in Millipore water. The bottle is stored for 10 days at 70° C.

The bottle is then rinsed repeatedly with water and dried.
40×40 mm pieces are cut out of the bottle (above: 8!) and the haze on this extrudate is determined in accordance with ASTM D 1703. A value of 45% is obtained. The starting value was 1% (ΔHaze: 39%).
Puncture Test in Accordance with ISO 6603-2:

The mean value for the penetration energy was 18.7 J. The mean value for the maximum force absorption was 2227 N.

It can be seen that the mechanical properties of the container according to the invention are improved in comparison to an extrudate corresponding to the prior art. At the same time the optical properties of the container according to the invention are improved.

The invention claimed is:

1. A process for producing a container consisting of a layer (1) and a top layer (2), wherein said layer (1) comprises polycarbonate and said top layer (2) comprises polyarylethersulfone or polyarylsulfone comprising
   a) melting polycarbonate on an extruder at a temperature of 230 to 320° C.,
   b) melting polyarylethersulfone or polyarylsulfone on a further extruder,
   c) shaping the melts obtained from steps a) and b) by coextrusion into a tube and enclosing said tube in a mould,
   d) inflating said tube inside said mould and pressing said tube against the wall of said mould to form the shape of the container, and
   e) trimming and cooling the container obtained from d), wherein the top layer (2) forms the interior layer of the container.

2. The process of claim 1, wherein in step c) the melts obtained from steps a) and b) are passed through a coextrusion adapter connected to a coextrusion die and shaped into a tube.

3. The process of claim 1, wherein the blow mould is heated to a temperature of 20 or 60° C.

4. The process of claim 1, wherein the blow mould is closed with a pinching force of 1000 to 1500 N per cm of pinch-off weld length.

5. The process of claim 1, wherein the melt temperature during processing of the polycarbonate necessary for producing the articles is 230 to 300° C.

* * * * *